Aug. 9, 1960  F. A. GORY  2,948,043
TILE MANUFACTURING MACHINE
Filed May 13, 1958  4 Sheets-Sheet 1
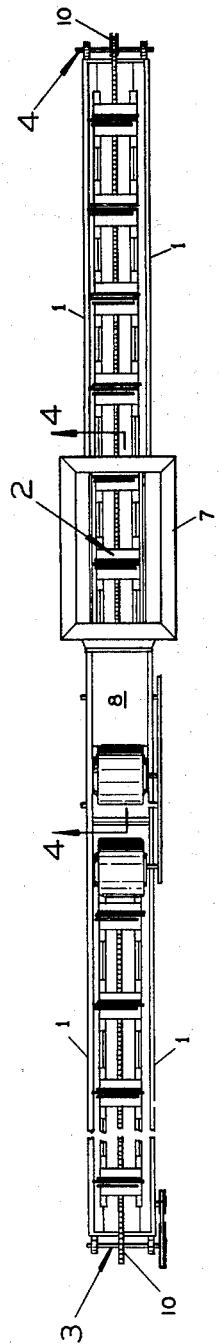
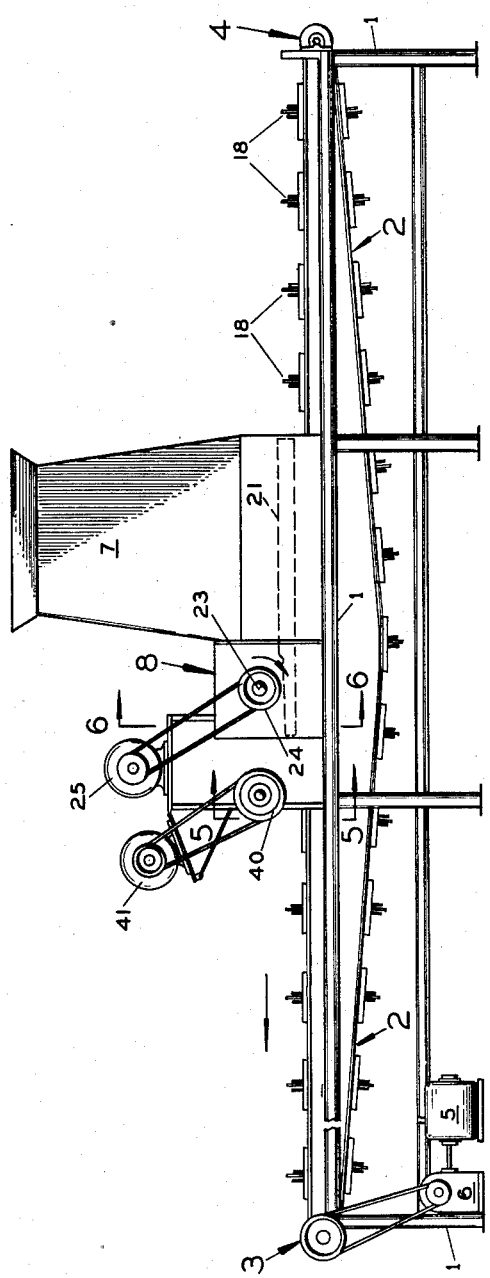
FIG. 2
FIG. 1
INVENTOR.
FRANK A. GORY
BY Aug. 9, 1960    F. A. GORY    2,948,043
TILE MANUFACTURING MACHINE
Filed May 13, 1958    4 Sheets-Sheet 2
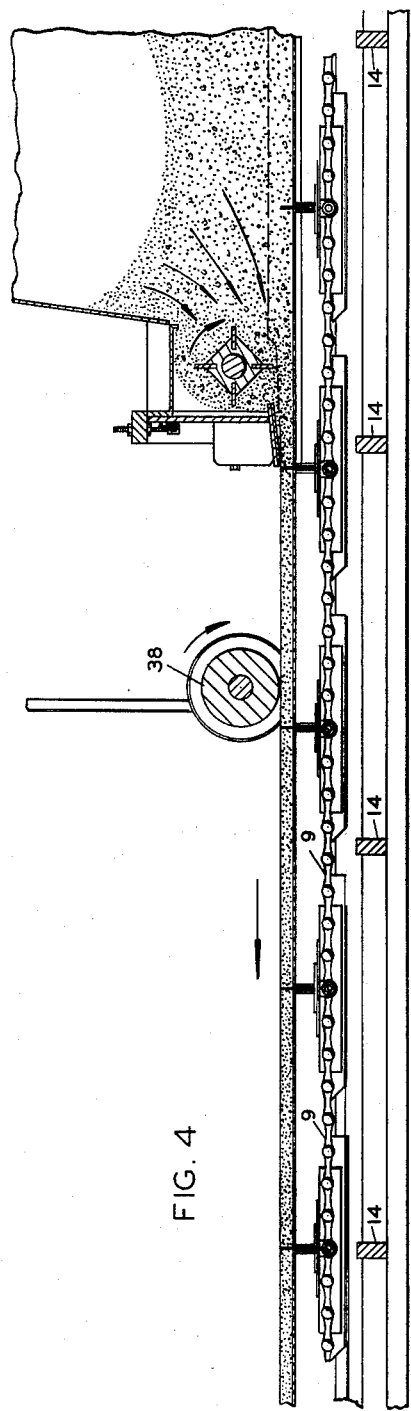
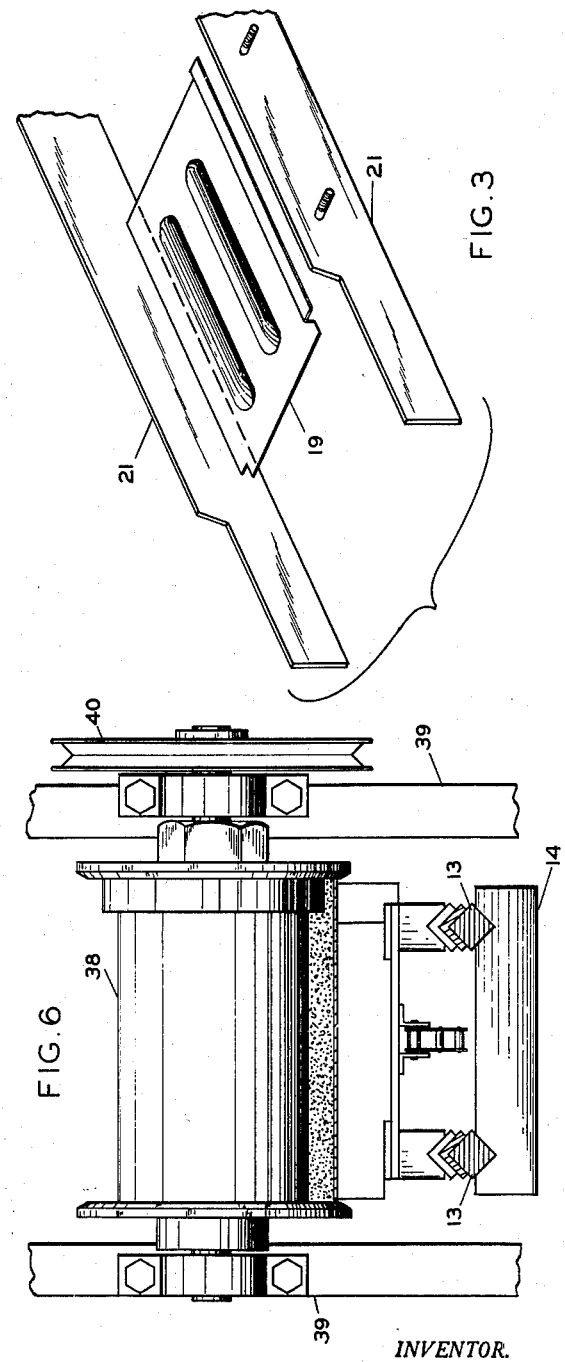
INVENTOR.
FRANK A. GORY
BY

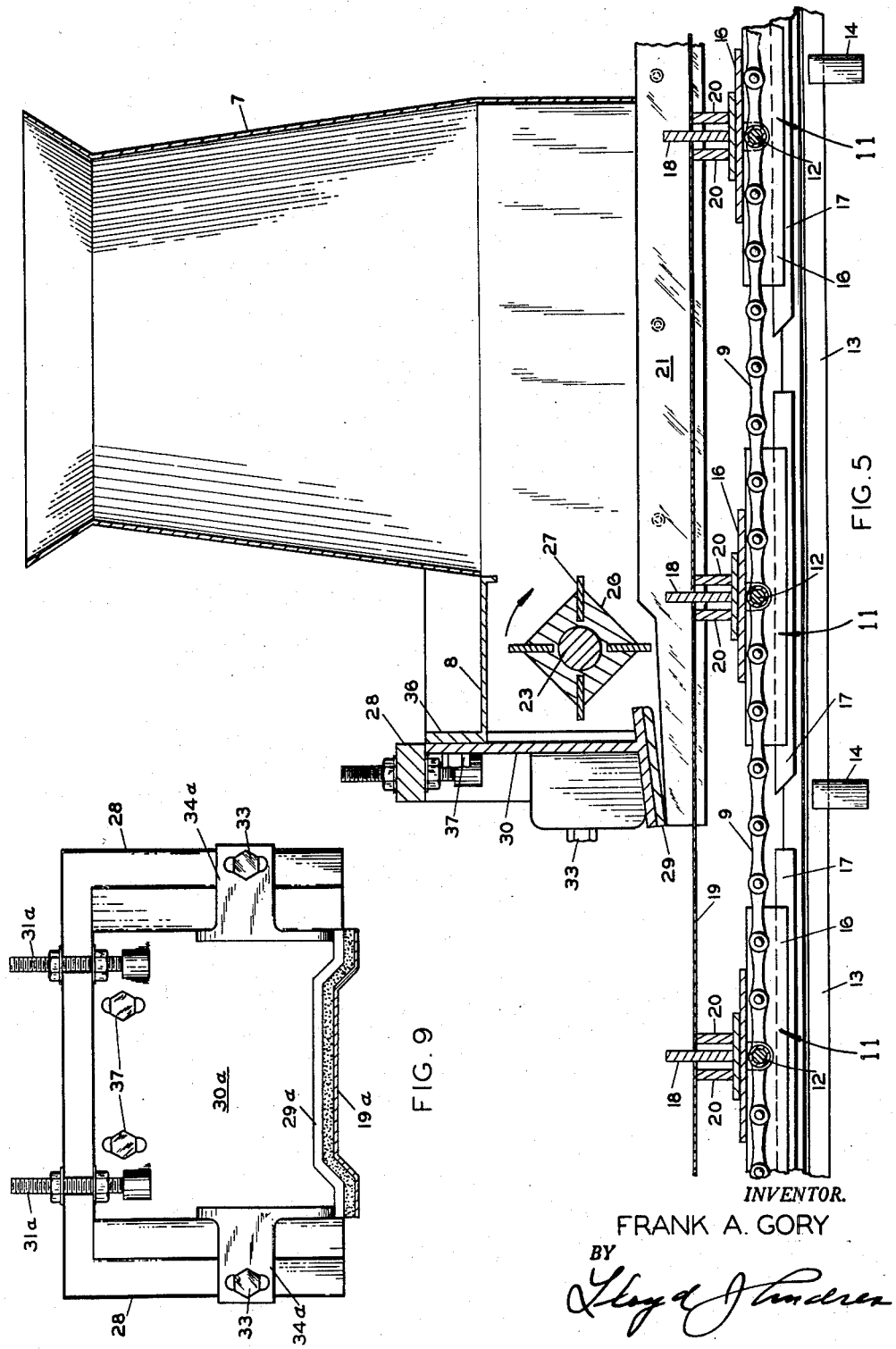

Aug. 9, 1960  F. A. GORY  2,948,043
TILE MANUFACTURING MACHINE
Filed May 13, 1958  4 Sheets-Sheet 4
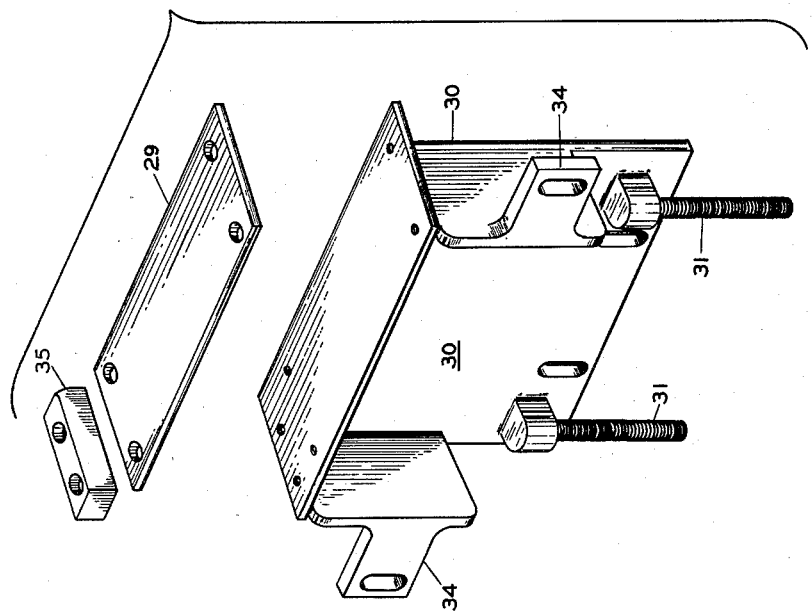
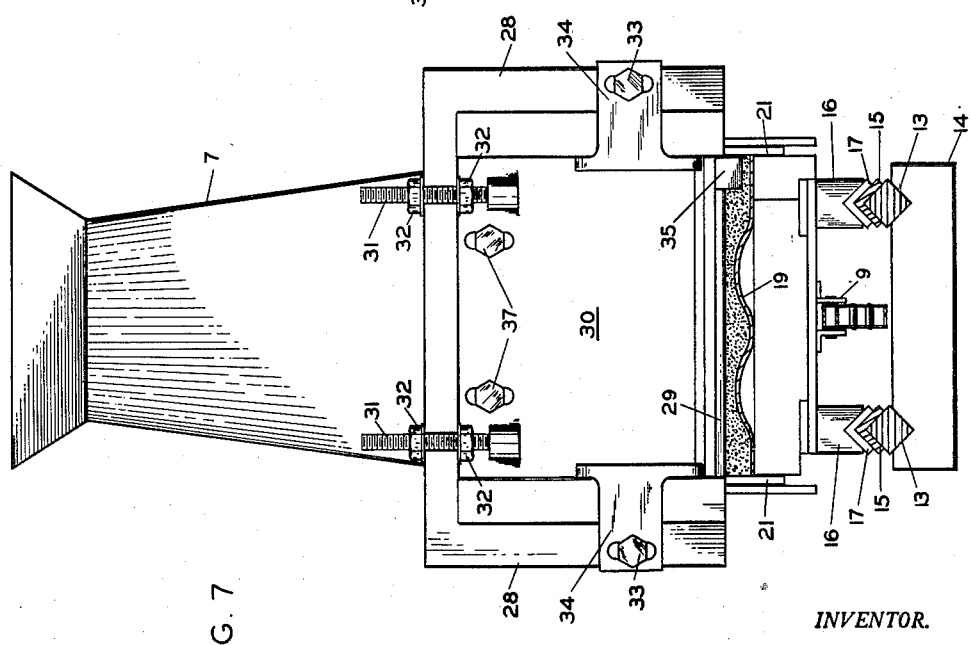
INVENTOR.
FRANK A. GORY
BY United States Patent Office 2,948,043
Patented Aug. 9, 1960

2,948,043
TILE MANUFACTURING MACHINE
Frank A. Gory, Hialeah, Fla.
(865 NW. 198th St., Miami, Fla.)
Filed May 13, 1958, Ser. No. 734,933
2 Claims. (Cl. 25—42)

This invention relates in general to machines for the manufacture of structural and or ornamental tile and more particularly to a machine for the automatic continuous manufacture of tile of uniform size and shape from plastic materials such as concrete, kaolin and refractory materials while the materials are in a plastic state.

Tile machines previous to this invention were necessarily operated at relatively low speeds and required considerable manual manipulation for feeding materials therein and required frequent manual adjustment and replacement of elements to minimize size variations, voids and irregular surface finish in the final products.

The present invention overcomes the above objections and disadvantages by the provision of an improved conveyor means for accurately aligning a plurality of pallet carriers during linear travel including a feeding mechanism for loading said pallets with plastic material without voids and surface imperfections which improvements are the principal objects of the invention.

A further object of the invention is the provision of a combination self compacting and sizing means for uniformly loading a plurality of linear movable pallets.

A further object of the invention is the provision of a feeding chamber for receiving plastic materials from a gravity fed hopper and uniformly loading a plurality of pallets moving thereunder including multiple means for uniformly compacting and surface finishing each tile carried on said pallets.

These and other objects and advantages is one embodiment of the invention are described and shown in the following specification and drawings in which:

Fig. 1 is a side elevation of the tile machine in reduced scale.

Fig. 2 is a plan view of the machine, shown in Fig. 1.

Fig. 3 is a perspective view of one of a plurality of like pallets used in the machine and stationary side plates for forming one form of tile.

Fig. 4 is a fragmentary cross-sectional view taken through section line 3—3, shown in Fig. 1.

Fig. 5 is a fragmentary cross-sectional view taken through line 4—4, Fig. 1 in larger scale.

Fig. 6 is an enlarged fragmentary cross-sectional view taken through section line 5—5, shown Fig. 1.

Fig. 7 is an enlarged fragmentary cross-sectional view taken through section line 6—6, Fig. 1.

Fig. 8 is an inverted perspective view of a portion of the compacting and sizing mechanism, shown Figs. 5 and 7.

Fig. 9 illustrates an alternate construction in the machine for forming an alternate form of tile.

The general arrangement of the machine is illustrated in Figs. 1 and 2 wherein a frame or bed 1 is adapted to support all elements of the machine. A chain conveyor assembly 2 is journalled for movement in the direction shown by arrows on conventional jack shaft means 3 and 4 at opposite ends of the frame as shown.

An electric power means comprising electric motor 5 and a speed reducer 6 belted to jack shaft means 3 is arranged for driving the conveyor at a predetermined constant linear speed when the motor is energized.

A hopper 7 having descending divergent sides and an open bottom is secured to frame 1 and constructed to straddle the conveyor 2 as shown Fig. 2. A rectangular housing 8 forming a material feeding chamber is secured to the frame 1 as shown and provided with an opening into the adjacent side of the hopper 7.

The conveyor assembly 2 consists of an endless chain means 9 engaged with suitable sprockets 10 on the jack shaft means at opposite ends of the frame 1. A plurality of pallet carriers 11 are pivotally secured to chain 9 in equi-spaced relation by link pins 12, as shown Fig. 5.

Referring to Fig. 7, a pair of equi-spaced parallel rails 13 are secured on spaced tie members 14 on frame 1 as shown Figs. 4 and 5. It is to be noted that each rail 13 provides a pair of angled divergent upper plane surfaces on which the carriers 11 are adapted to travel.

Since the machine operates in the presence of abrasive materials, a wear resistant inverted V facing 15 is secured along the entire length of each rail. Each of the facings 15 is adapted for removal by screw means, not shown, for refinishing or replacement. A base member 16 of each carrier is provided with a pair of integral supports for removably retaining a pair of wear resistant V-shaped shoes 17 adapted for sliding frictional engagement with facing means 15.

It is important to note that the use of the V-shaped rails and shoes 17 provide precise lateral positioning of each carrier 11 with respect to the frame 1 regardless of reasonable wear of the facing means 15 and shoes 17. Compensation for the vertical displacement of the carriers 11, as a result of wear, will be hereinafter described.

Conventional lateral guides commonly used for conveyors would rapidly wear because of contamination with the abrasive material.

Referring to Figs. 1 and 5, pallet dividers 18 are secured to each base member 16 directly above each link pin 12 for the purpose of longitudinally positioning each pallet 19 therebetween and for forming the opposite end surfaces of each tile. Pallet supports 20 also secured to the base member 16 are positioned adjacent opposite sides of each divider 18 and serve to support each pallet by opposite ends thereof during its travel on the conveyor means.

A pair of parallel disposed vertical side plates 21 are secured for lateral adjustment on inside opposite sides of the hopper 7 in close proximity with the path of travel of opposite side edges of each pallet retained in each carrier. The plates 21 form the opposite side surfaces of each tile, as illustrated in Figs. 3, 5 and 7.

Referring to Figs. 1 and 4, a feeder impeller assembly 22 is journalled for rotation in housing 8 on bearings, not shown. The impeller comprises a drive shaft 23 and a driven pulley 34 belted to be rotated in the direction shown by arrow by an electric motor 25.

Referring to Fig. 5, the impeller comprises a body 26 secured to shaft 23 and a plurality of wear resistant radial blades 27 having proper length to bridge each pallet positioned thereunder by a carrier 11.

Referring to Figs. 5 and 7, a bridge member 28 is secured to frame 1 adjacent the impeller, as shown Fig. 5, for adjustably retaining a combination compacting and sizing shoe 29, better shown in Figs. 7 and 8.

A carriage 30 is adjustably supported in bridge member 28 by a pair of threaded studs 31 secured in said carriage, as shown, and retained in appropriate holes in the bridge member 28 by adjustment nuts 32. The carriage is further supported by hex screws 33 threaded into bridge 28 through slots in arms 34 integral with the carriage. A shaping and sizing shoe 29 is secured to the lower portion of the carriage 30 by screws, not shown. An additional block 35 is superimposed on one end of shoe 29 for forming an interlock mortise in each tile. It is to be noted that other forms of shoes may be secured to carriage 30 for producing different shapes of tile.

Referring to Fig. 5, the upper side of housing 8 is adjustably retained to the carriage 30 by an offset 36 and screws 37, as shown, whereby the clearance between the impeller blades and the upper side of the housing 8 may be adjusted for predetermined clearance when blades having different edge shapes are used for different shaped tile.

It is to be noted that the shoe 29 is positioned in a slight angle with respect to the path of movement of the pallet for compressing the plastic material into each pallet as will be hereinafter described.

It is now apparent that an accurate adjustment of the shoe with respect to the pallet can be readily made for controlling the precise thickness of the tile when the pallets are moved thereunder.

It is also to be noted that any wear occurring between the rails 13 and on the shoes 29 can be readily compensated by occasional vertical adjustment of the carriage 30 by means of studs 31—31 in the bridge 28.

Referring to Figs. 1, 4 and 6, a final smooth finish is applied to the tile retained in each pallet by a flanged polishing cylinder 38 which has an outer contour machined to the exact contour of the finished tile. The cylinder is journalled for rotation on a bridge member 39 and adapted for vertical adjustment thereon, as shown Fig. 6, and is rotated by means of a pulley 40 belted to an electric motor 41, as illustrated in Fig. 1.

Tile of different shape and conformation may be readily manufactured in the machine by the simple change of the carriage member 30, illustrated in Fig. 9, wherein a carriage 30a is provided with a shoe 29a having a predetermined shape, as illustrated, which in some instances utilizes a different shaped pallet 19a. When an alternate form of shoe 29a is used a cylinder 38a and alternate blades 27a, not shown, having the same contour as the shoe 29a is required in order to form and finish the outer contour of each tile to correspond with the major shape of the tile as conformed by the shoe 29a.

In operation the conveyor is driven at a predetermined constant linear velocity and the impeller 22 and cylinder 38 rotated with the linear velocity of blades 27 and the peripheral surface of cylinder 38 travelling with a predetermined linear velocity in excess of the conveyor velocity.

Under the assumption that empty pallets are continuously fed into the carriers at the loading end of the conveyor, they will first move under hopper 7, and assuming that plastic material of predetermined consistency is periodically loaded into the hopper, the material will descend by gravity and loosely fill each passing pallet.

When each loosely loaded pallet passes into the chamber formed by housing 8, the rotating blades 27 of the impeller will churn the material in the chamber and compress an excess of material into the pallet and the confined space thereabove between the side plates 21.

As each pallet is moved under shoe 29, the material will be compressed in each pallet by the angular converging stricture formed by shoe 29 and the co-linear force exerted on the material by the rotating blades of the impeller. Thus the material on each pallet will be shaped and compacted to a self-supporting consistency free of voids.

Continued movement of the conveyor will move each pallet under the rotating cylinder 38 whereby the top and side surfaces of the tile will be frictionally burnished by the over-running cylinder to a smooth surface and each tile simultaneously reduced to precise dimensions. Following the burnishing operation each pallet with a finished tile thereon is carried to the discharge end of the machine for removal and curing.

It is to be noted that the downward divergent walls of the hopper 7 play an important part in gravity feeding the plastic materials by preventing bridging, resulting in voids, and in reducing the frictional contact of the material as it descends for the rapid loading of the pallets passing thereunder.

It is also apparent that the V-shaped rails and the mating carrier shoes provide for precise linear travel of the carriers without need for lateral conveyor guide members thus permitting the plates 21 for forming the side walls for the tile to be adjusted to close limits with respect to each pallet without excessive frictional wear on the surface of the plates or the edges of the pallets.

Having described my invention, I claim:

1. In a tile machine of the character described, means forming a frame, an endless conveyor for transporting a continuous plurality of tile pallets comprising a chain means engaged on rotary members journalled in opposite end portions of said frame with the upper portion of said chain means adapted for uni-directional linear movement, power means coupled to said chain means for driving same when energized, a hopper means on said frame positioned over said chain means for receiving periodic loads of plastic material in the form of a column therein for gravity loading said pallets when the latter are moved thereunder, said hopper forming a loading chamber divergent toward the said chain means, a pair of stationary parallel positioned forming plates attached to said hopper in the lower portion of said hopper at opposite sides thereof in close proximity to the path of travel of the sides of said pallets whereby said material in said hopper will gravitate into the space over each of said pallets bounded on two sides by said forming plates when said power means is energized and said pallets are continuously moved by carriages in one direction, a housing forming a feeding chamber secured to said frame straddling said conveyor and positioned adjacent to and opening into one side of said hopper means for receiving therefrom and confining portions of said material therein, an impeller means having a plurality of radially extending blades journalled for rotation in said chamber transverse to said conveyor with the path of movement of the outer edges of said blades substantially parallel to and spaced a predetermined distance from the path of movement of said pallets, power means for rotating said impeller means when energized, a bridge member secured to the frame, a combination compacting and forming shoe secured to said bridge member and positioned to transverse the path of movement of said pallets and spaced from said impeller means, said shoe having a lower forming shape divergent with respect to said impeller means whereby the movement of each of said pallets under said hopper said chamber and said shoe will loosely load said pallets with said material from said hopper and said pallets will receive a further compressed loading of additional material in said housing by the rotation of said impeller means and the stricture action of said shoes for forming a tile of predetermined shape on each of said pallets when both said power means are energized, a finishing cylinder journalled for rotation on said frame with its axis of rotation positioned transverse to the movement of said pallets, said cylinder being located a predetermined distance above said loading path, said cylinder having a predetermined transverse outer contour substantially equal to the forming shape of said shoe, power means for rotating said cylinder whereby each tile carried by each of said pallets from beneath said shoe will move under said cylinder and be burnished and finished to a predetermined shape thereby when said last named power means is energized, a pair of equi-spaced linear rails positioned parallel to and under said chain means, each of said rails having upper inverted inclined sides forming an inverted V, a plurality of equi-spaced pallet carriages pivotally secured to said chain means, each of said carriages having a pair of parallel spaced downwardly extending portions terminating in parallel shoes located on opposite sides of said chain means, each portion having an inclined inverted V face corresponding to the inclined sides of said rails, a plurality of facing means each having upper and lower inverted V faces whereby to adjust said carriages vertically toward and away from said shoe and said cylinder, the upper faces of said facing means being engageable by the inverted faces of said shoes and the lower faces of said facing means being in removable engagement with the said faces of said rails, each of said pallet carriages having an integral pallet separator positioned above and transverse to said chain means for forming the opposite ends of a tile, and a pallet support on each carriage located at each side of one of said separators for supporting a pallet bridged between each pair of said adjacent separators on each pair of adjacent carriages.

2. The structure of claim 1 wherein means is provided for adjusting said forming shoe on said bridge member including a pair of threaded studs connecting said shoe to said bridge member, a pair of arms extending laterally above and on each side of said shoe, each arm having a vertically extending slot and a screw means adjustably engaging each of said slots whereby to adjust the clearance between said impeller blades and to adjust the shoe in the vertical direction.

References Cited in the file of this patent

UNITED STATES PATENTS

| | | |
|---|---|---|
| 1,559,499 | Brandell | Oct. 27, 1925 |
| 1,559,500 | Lidseen | Oct. 27, 1925 |
| 1,578,467 | Phillips et al. | Mar. 30, 1926 |
| 1,599,404 | Brandell | Sept. 14, 1926 |
| 2,320,728 | Hume | June 1, 1943 |
| 2,531,574 | Lang | Nov. 28, 1950 |
| 2,545,366 | Mandryl | Mar. 13, 1951 |
| 2,641,819 | Peavy | June 16, 1953 |
| 2,734,249 | Willis | Feb. 14, 1956 |
| 2,847,749 | Lang | Aug. 19, 1958 |

FOREIGN PATENTS

| | | |
|---|---|---|
| 22,365 | Denmark | Aug. 7, 1917 |
| 144,538 | Sweden | Mar. 16, 1954 |